US012172407B2

(12) United States Patent
Deis et al.

(10) Patent No.: US 12,172,407 B2
(45) Date of Patent: Dec. 24, 2024

(54) ARRANGEMENT FOR PRODUCING EMBOSSED CUSHIONING MATERIAL AND METHOD FOR PRODUCING EMBOSSED CUSHIONING MATERIAL

(71) Applicant: Storopack Hans Reichenecker GmbH, Metzingen (DE)

(72) Inventors: Paul Deis, Preuschdorf (FR); Jean-Marc Slovencik, Rosenfeld (DE)

(73) Assignee: Storopack Hans Reichenecker GmbH, Metzingen (DE)

( * ) Notice: Subject to any disclaimer, the term of this patent is extended or adjusted under 35 U.S.C. 154(b) by 0 days.

(21) Appl. No.: 18/004,272

(22) PCT Filed: Jun. 24, 2021

(86) PCT No.: PCT/EP2021/067425
§ 371 (c)(1),
(2) Date: Jan. 4, 2023

(87) PCT Pub. No.: WO2022/012900
PCT Pub. Date: Jan. 20, 2022

(65) Prior Publication Data

US 2023/0278307 A1 Sep. 7, 2023

(30) Foreign Application Priority Data

Jul. 15, 2020 (EP) .................................... 20186030

(51) Int. Cl.
*B31D 5/00* (2017.01)

(52) U.S. Cl.
CPC ........... *B31D 5/006* (2013.01); *B31D 5/0052* (2013.01); *B31D 5/0069* (2013.01);
(Continued)

(58) Field of Classification Search
CPC .... B31D 5/0052; B31D 5/006; B31D 5/0069; B31D 5/0043; B31D 2205/0058;
(Continued)

(56) References Cited

U.S. PATENT DOCUMENTS

| | | | | |
|---|---|---|---|---|
| 3,288,353 | A | 11/1966 | McCullough | |
| 2007/0004576 | A1 * | 1/2007 | Elsayed .................... | B31F 1/22 493/463 |
| 2015/0045198 | A1 * | 2/2015 | Basily ................... | B31F 1/0019 493/454 |

FOREIGN PATENT DOCUMENTS

| | | | |
|---|---|---|---|
| DE | 613146 | C | 5/1935 |
| DE | 908441 | C | 4/1954 |

(Continued)

OTHER PUBLICATIONS

PCT/EP2021/067425 Written Opinon dated Sep. 15, 2021.
(Continued)

*Primary Examiner* — Thomas M Wittenschlaeger
(74) *Attorney, Agent, or Firm* — Wood Herron & Evans LLP

(57) ABSTRACT

An arrangement for producing embossed cushioning material from an initially flat material comprises an embossing device for providing a plurality of embossed protrusions to the material, an undulating device comprising undulated forming spaces which creates undulations in the initially flat material prior to the undulated material being provided to the embossing device, and a conveying means for conveying the initially flat material along a transport path in a continuous process through the undulated forming spaces. It is that suggested that the undulating device, seen in the direction of the transport path, comprises at least two stages each comprising an undulated forming space, the undulated forming
(Continued)

Figure 1:
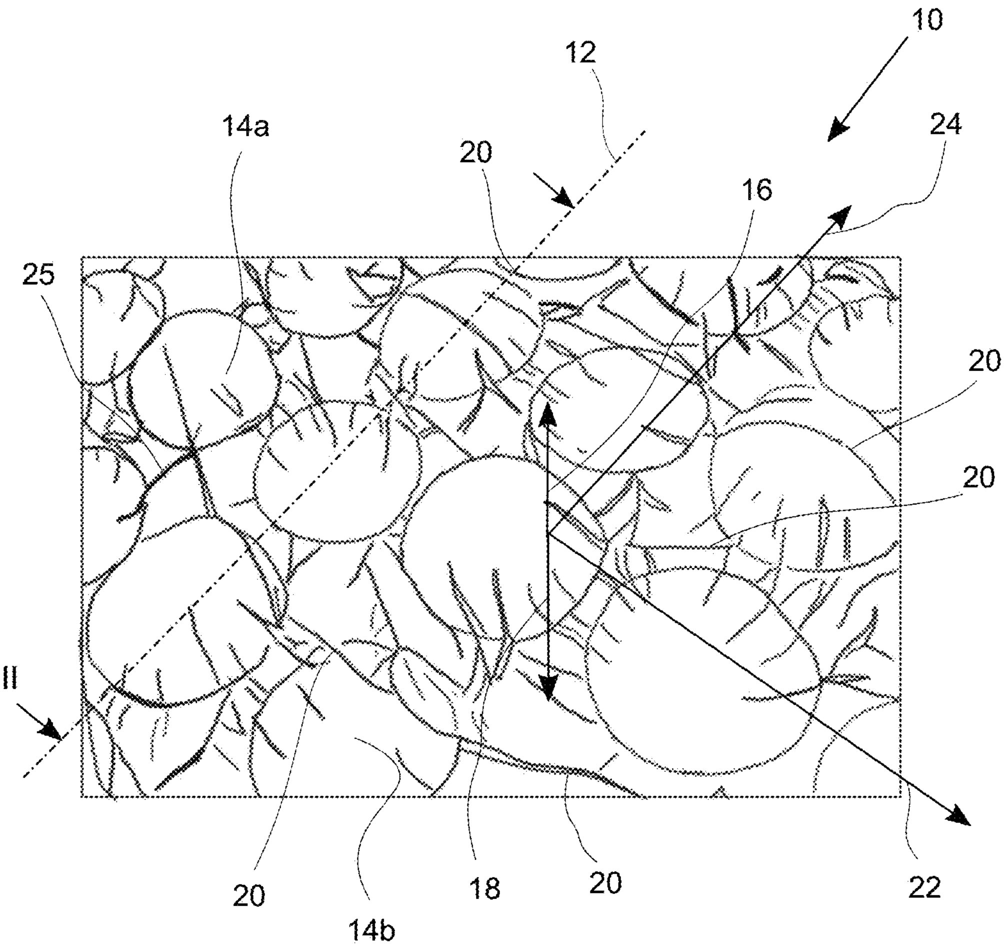

space of a downstream stage differing in number and/or height of undulations from the undulated forming space of an upstream stage.

13 Claims, 11 Drawing Sheets

(52) U.S. Cl.
CPC ................ *B31D 2205/0023* (2013.01); *B31D 2205/0035* (2013.01); *B31D 2205/0047* (2013.01)

(58) Field of Classification Search
CPC .... B31D 2205/0035; B31D 2205/0082; B31D 2205/0047; B31D 2205/0011; B31D 2205/0023; B31F 1/22
See application file for complete search history.

(56) References Cited

FOREIGN PATENT DOCUMENTS

| | | | |
|---|---|---|---|
| DE | 1675907 | U | 5/1954 |
| DE | 1894663 | U | 6/1964 |
| DE | 19509863 | A1 | 4/1996 |
| DE | 19757982 | A1 | 7/1999 |
| EP | 2719526 | A1 | 4/2014 |
| WO | 2019/020631 | A1 | 1/2019 |

OTHER PUBLICATIONS

EP 20186030.1-1016 European Search Report dated Dec. 22, 2020.
PCT/EP2021/067425 International Search Report dated Sep. 15, 2021.
PCT/EP2021/067425 International Preliminary Report on Patentability dated Jul. 4, 2022.

* cited by examiner

ARRANGEMENT FOR PRODUCING EMBOSSED CUSHIONING MATERIAL AND METHOD FOR PRODUCING EMBOSSED CUSHIONING MATERIAL

This Application is a US National Phase Application of PCT/EP2021/067425 filed Jul. 24, 2021, which claims the priority benefit of European Patent Application No. 20 186 030.1-1016 filed Jul. 15, 2020, both of which are hereby incorporated by reference herein as if fully set forth in their entirety.

The invention relates to an arrangement for producing embossed cushioning material and a method for producing embossed cushioning material.

It is known from the market to protect objects to be transported or shipped from impacts or other harmful external influences by wrapping these objects with a cushioning material. Such a cushioning material can be, for example, a bubble wrap made of plastic, or another three-dimensional cushioning material, which for example has bulges similar to an egg carton.

International patent publication WO 2019/020631 A1 discloses a cushioning paper material for packaging purposes having a cushioning portion comprising a plurality of convex protrusions and concave recesses. Similar cushioning materials are disclosed in DE 1 894 663 U, DE 1 675 907 U, and U.S. Pat. No. 3,288,353 A. It is a known technique for producing this type of cushioning paper material to provide a plurality of embossed protrusions to an initially flat web type paper material. In order to prevent the paper material from cracking when creating the embossed protrusions, the paper material is treated by hot steam prior to the embossing step such that it becomes more elastic and soft.

DE 195 09 836 A1 relates to manufacturing a shaped embossed body from a two-dimensional paper material and proposes a forming device creating a plurality of channel-shaped depressions in the initially flat web-type paper material. DE 613 146 discloses a device for manufacturing a paper web having a plurality of longitudinally extending undulations.

It is an object of the present invention to provide an arrangement for producing embossed cushioning material consuming less energy and being less complicated. It is a further object of the present invention to provide an arrangement for producing embossed cushioning material having superior cushioning properties.

The above-mentioned and other objects are achieved by means of an arrangement for producing embossed cushioning material and a method for producing embossed cushioning material of the independent claims. Advantageous further embodiments are described in dependent claims.

With the inventive arrangement and method it is no more necessary to pretreat the material by means of hot steam prior to creating embossed protrusions in the initially flat material. By consequence, the arrangement itself is less complicated and uses less energy for the production of the embossed cushioning material. Furthermore, the embossed cushioning material itself has superior cushioning properties because its stiffness is not weakened by applying hot steam, but rather increased by providing creases. It is to be understood that the inventive arrangement of course may additionally comprise a device for applying hot steam, water dust or water spray to the material, in order to further facilitate the provision of the plurality of embossed protrusions. However, such a device for applying hot steam, water dust or water spray is not indispensable with the inventive arrangement.

According to the invention the surplus of material and the material elasticity necessary for providing the embossed protrusions without risking to create cracks or ruptures, respectively, in the material during the embossing step is provided by means of undulations created in the initially flat material prior to the embossing step. This means that after undulating the material comprises a plurality of waves and therefore is generally no more flat but rather three-dimensional.

It is to be understood that the term "cushioning material" is not limited to material used for wrapping products for shipping. Rather, the term "cushioning material" additionally covers a product which is used for example for food packaging and/or presenting, more specifically for packaging and/or presenting fruits or vegetables or the like. In this case, an embossed protrusion may have a size and shape which essentially complies with the size and shape of the fruit or vegetable to be packaged.

More specifically, the invention proposes an arrangement for producing embossed cushioning material from an initially flat material. The arrangement may comprise a supply for supplying the flat paper material. A web type flat material may be provided by way of example as a roll of paper, but it also may be provided as a stack of zigzag folded paper. The material may be a single ply material, but it also may be a double or triple or multiple ply material. The use of craft paper material, especially recycled craft paper material, is particularly preferred.

The arrangement comprises an embossing device for providing a plurality of embossed protrusions to the paper material. The embossed protrusions may have an essentially half-spherical or cylindrical shape. The arrangement may comprise a conveying device for conveying the initially flat material from the supply along a transport path to the embossing device. The conveying device may comprise one or more driven rollers and/or conveyor belts. The rollers and/or conveyor belts may be driven by means of electrical motors which are connected to the rollers by gear means, such as belts or toothed wheels.

The transport path may be generally linear or may have linear sections which are delimited by driven or non-driven rollers. The transport path may start at the material supply and may end at an exit where the embossed cushioning material is output. Further processing steps may be provided downstream of the exit in order to create a finished product to be immediately used as a cushioning material. These further processing steps may include a cutting step and/or a perforating step and/or a stacking step.

In order to create the above mentioned undulations in the initially flat material the arrangement further comprises an undulating device which may be arranged in the processing line or in the transport path, respectively, upstream of the embossing device and which provides undulations to the initially flat material. It is to be understood that the term "undulating" does not necessarily mean that the undulations are created accidentally. Rather, it is particularly preferred to provide undulations at specific positions of the material. Further, the term "undulations" does not necessarily mean that the "waves" are evenly distributed and all have similar shapes and dimensions. Rather, the shapes, dimensions of the waves, and their distribution may be selected according to the specific needs of the embossed cushioning material to be produced.

The undulating device is designed and arranged to create essentially linearly extending undulations to the material thereby reducing a first dimension of the initially flat material. Especially in the case of an elongated web type paper material which is fed along a transport path through the undulating device in a continuous manufacturing process such undulations or waves, respectively, extend essentially in longitudinal direction of the web type paper material and are at least essentially parallel to each other. Such undulations can easily be provided in a continuous manufacturing process by appropriate forming portions in the transport path of the paper material.

The material exiting the undulating device and comprising said undulations forms an intermediate material or product, respectively, which then is provided to the embossing device where the embossed protrusions are created. While the embossed protrusions essentially create the cushioning effect at the finished product, the undulations provide an excess or surplus of material allowing to create the embossed protrusions without tearing or breaking the material. It is to be understood that those undulations which are not or not entirely consumed for creating the protrusions are pressed during the embossing step into (sharp) creases which remain visible at the finished embossed cushioning material.

Moreover, in the inventive arrangement the undulating device, seen in the direction of the transport path, comprises at least two stages each comprising an undulated forming space, the undulated forming space of a downstream stage differing in number and/or height of undulations from the undulated forming space of an upstream stage.

An upstream first stage of the undulating device may create a relatively low number of undulations having a relatively important height, whereas a downstream stage of the undulating device may create a relatively high number of undulations having a relatively low height.

In a further embodiment of the inventive arrangement an (overall) lateral extension of the undulating forming space of a downstream stage is greater than the (overall) lateral extension of the undulating forming space of an upstream stage. By consequence, the width of the region of the material having undulations increases from one stage to another stage. This provides for a smooth creation of the undulations and prevents the material from being damaged.

In a further embodiment a height (i.e. in a physical meaning an "amplitude") of the undulations of the undulating forming space of a downstream stage is essentially identical to the height ("amplitude") of the undulations of the undulating forming space of an upstream stage. Again, this provides for a smooth creation of the undulations and prevents the material from rupture.

In a further embodiment a width (i.e. in a physical meaning a "wavelength") of the undulations of the undulating forming space of a downstream stage is essentially identical to the width ("wavelength") of the undulations of the undulating forming space of an upstream stage.

In a further embodiment each stage comprises, seen in lateral direction (that is a direction orthogonally to the transport path and essentially in the plane of the initially flat material), at least one region which is free of any undulated forming space and which is delimited on both sides by regions having an undulated forming space. Or, in other words: the undulated intermediate web of material comprises a longitudinally extending region without undulations, this regions being delimited by regions having undulations. This is advantageous if the final web material shall receive any further treatment in specific regions, such as, by way of example, receive a perforation or being separated.

In a further embodiment, seen in the direction of the transport path, the number of regions which are free of any undulated forming space increases from at least one upstream stage to a subsequent downstream stage. Again, this prevents the material from rupture.

In a further embodiment the undulated forming space is formed between two counter rotating forming rollers. This reduces friction between the initially flat material and the undulating device and therefore reduces wear at the material as well as at the undulating device. The forming rollers each may have a plurality of disk type portions which are spaced apart from each other and arranged along a longitudinal axis of the roller such that interstices are formed between adjacent disk type portions. The disk type portions of the first roller mesh with interstices between the disk type portions of the second roller, the interstices formed between the meshing disk type portions of the first and second rollers forming the undulated space creating the undulations of the initially flat web-type paper raw material when it passes between the first and the second forming rollers.

Since the disk type portions of the rollers rotate in the sense of the transport direction of the web type paper material, relative movement and thus friction between the disk type portions and the material is low, and by consequence abrasive wear of the paper material is low. It is however to be understood that the undulated forming space alternatively may be formed between stationary and fixed elements.

The undulating device may be designed and arranged to reduce the first dimension of the material by approximately 20-60%, more preferably by approximately 40%. These parameters have proven to be the best compromise between the provision of a sufficient surplus of material and minimum consumption of material for creating said surplus.

In a further embodiment the undulating device comprises a crumpling device which crumples the paper material in a second dimension which is orthogonal to the first dimension. This further homogenizes the repartition of the surplus of material and reduces the anisotropy of the "elasticity" created by the undulations. Another advantage of such a crumpling is that it easily can be provided by known technologies.

It is particularly preferred to reduce the dimension of the material in the second dimension by means of crumpling by approximately 5-20%, more preferably by approximately 10%, per length unit. These parameters have proven to be the best compromise between the provision of a sufficient surplus of material and minimum consumption of material for creating said surplus.

In a further embodiment hereto the crumpling device comprises a first driven conveying means and a second driven conveying means, the first driven conveying means being upstream when seen in the direction of the transport path, and the second driven conveying means being downstream when seen in the direction of the transport path, wherein each conveying means is designed and arranged to frictionally convey the material along the transport path, wherein in operation the conveying speed of the second conveying means is lower than the conveying speed of the first conveying means. This is a known and reliable technique for longitudinally crumpling a web type material.

In a further embodiment the embossing device comprises a first embossing cylinder and a second embossing cylinder, wherein the first embossing cylinder and the second embossing cylinder are designed and arranged to receive the undulated material therebetween, at least the first embossing cylinder having a peripheral surface comprising a plurality of protrusions creating embossed protrusions in the material when it is received between the first embossing cylinder and the second embossing cylinder. This type of embossing device enables a high output of cushioning material either in a continuous or in a semi-continuous process. The shape and dimension of the protrusions as well as their positions define the shape and dimensions and the positions of the embossed protrusions in the finished cushioning material.

The peripheral surface of the second embossing cylinder may comprise a plurality of recesses which are complementary to the protrusions of the first embossing cylinder such that the protrusions mesh with the recesses during rotation of the cylinders. The protrusions and the recesses are dimensioned relative to each other to receive the undulated material therebetween without damaging it. This embodiment is particularly preferred in order to exactly shape the embossed protrusions in the cushioning material as desired, especially in the case of embossed protrusions having a relatively important height. Especially in the case of embossed protrusions of a relatively low height the second embossing cylinder simply may be made of an elastic material such as rubber or silicone and without any complementary recess.

The undulating device may be designed and arranged to create undulations to the paper which are in line with the protrusions in the first and/or second embossing cylinder. By doing so the surplus of material may be created more or less exactly there where it is needed, which further increases the quality of the finished cushioning material.

The first embossing cylinder and the second embossing cylinder may be part of the second conveying means of the crumpling device. This reduces the complexity, cost and size of the inventive arrangement.

In a further embodiment the arrangement comprises a separating device which is arranged immediately downstream of the embossing device, and which is arranged and designed to prevent the embossed material exiting from the embossing device from staying sticked to the embossing cylinders (which includes to smoothly lift-off the exiting material from the embossing cylinders). This embodiment enhances the quality of the embossed cushioning material and reduces downtime of the arrangement during operation.

In a further embodiment the separating device comprises a deflector, wherein the embossing device, seen in lateral direction, comprises a region where the embossing device is free of protrusions, and wherein, seen in the direction of the transport path, the deflector is essentially aligned with the region which is free of protrusions. This embodiment is mechanically simple and reliable. Since the deflector is arranged at a lateral position where the material exiting from the embossing device does not have protrusions but is rather flat, the deflector can easily lift off the material from the embossing cylinder(s) without the risk of damaging the embossed cushioning material.

In a further embodiment, seen in the direction of the transport path, the deflector is essentially aligned with the above mentioned region of the undulating device which is free of any undulated forming space. This further enhances the function of the separating device, because the deflector acts in a region onto the embossed cushioning material exiting the embossing device where there are not only no protrusions but also no or at least less creases.

In a further embodiment the arrangement comprises a folding device which is arranged and designed to fold at least one lateral edge portion of the initially flat material or of the undulated intermediate material inwardly upon itself. This increases the strength of the lateral edge of the embossed cushioning material.

Figure 2:
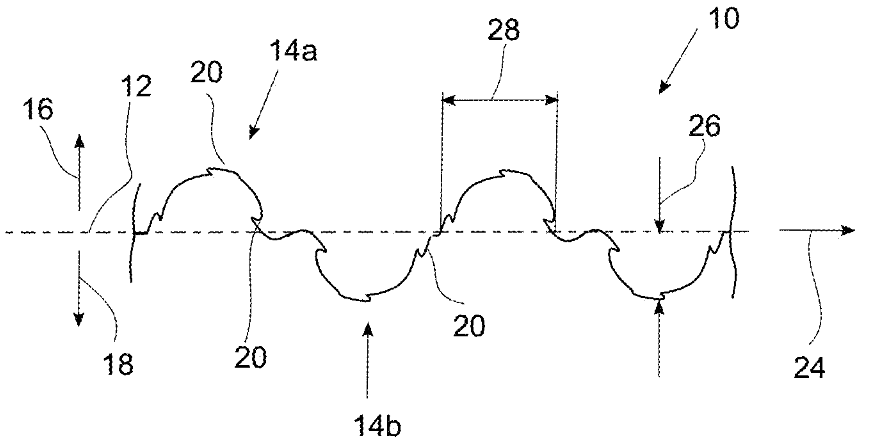
Figure 3:
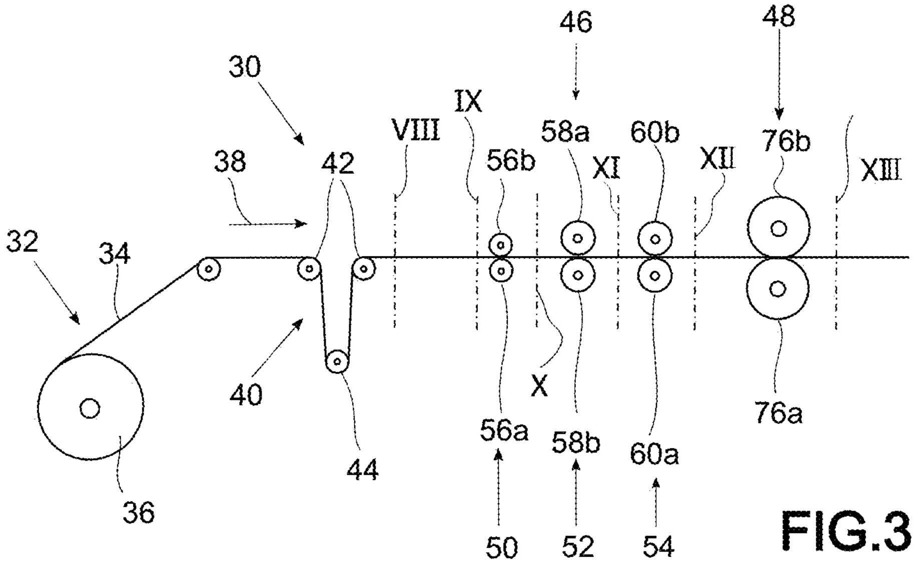
Figure 4:
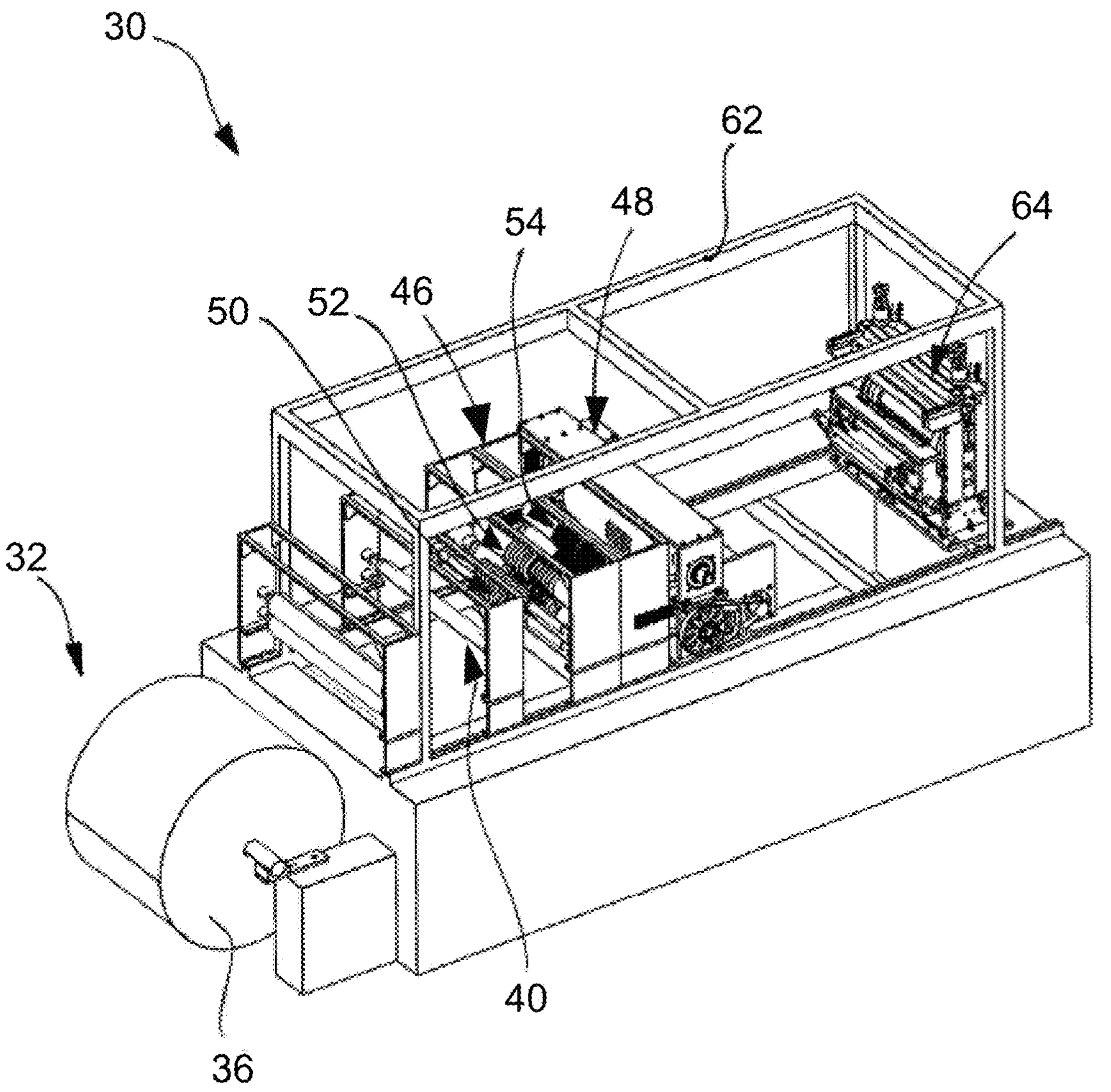
Figure 5:
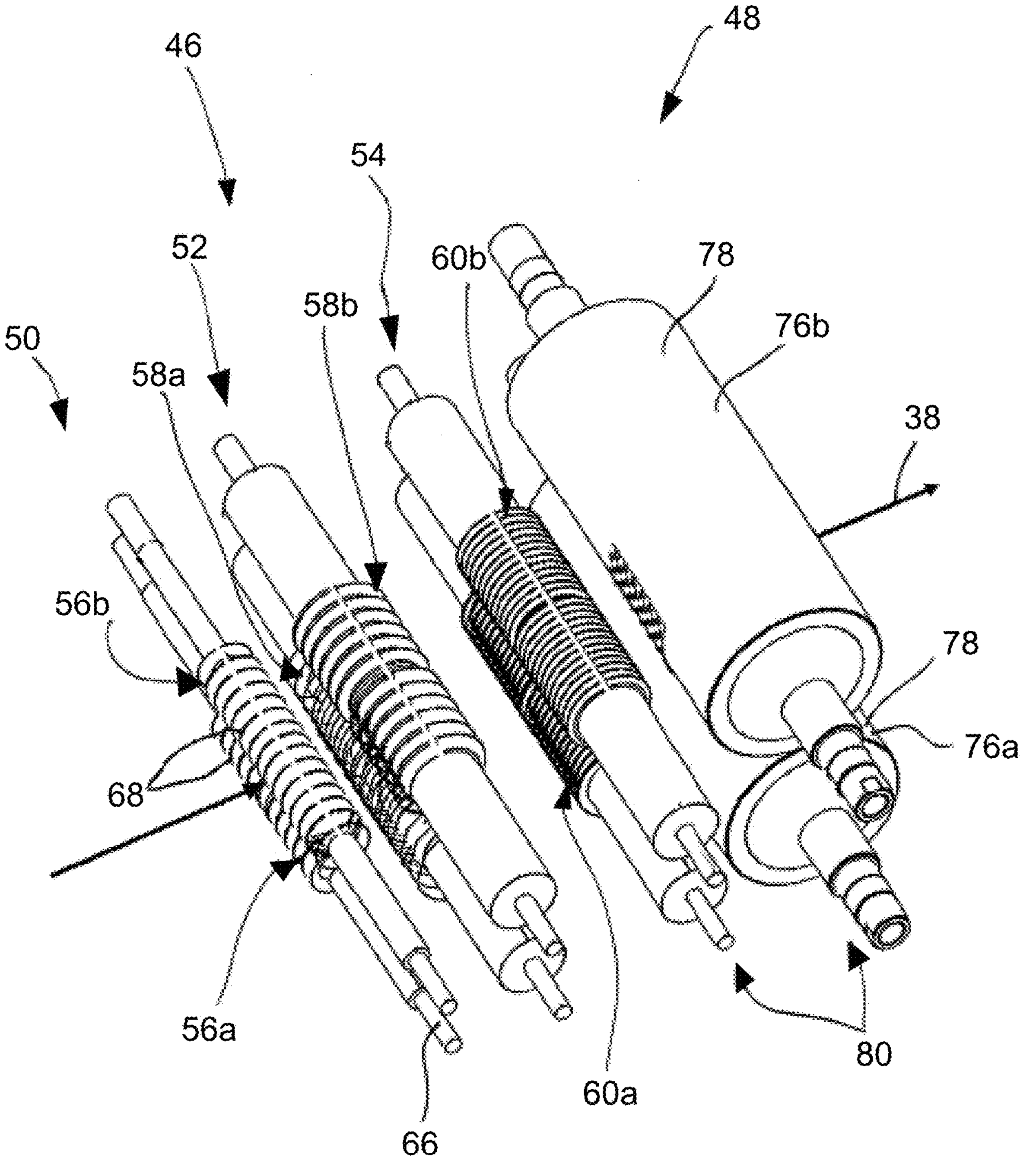
Figure 6:
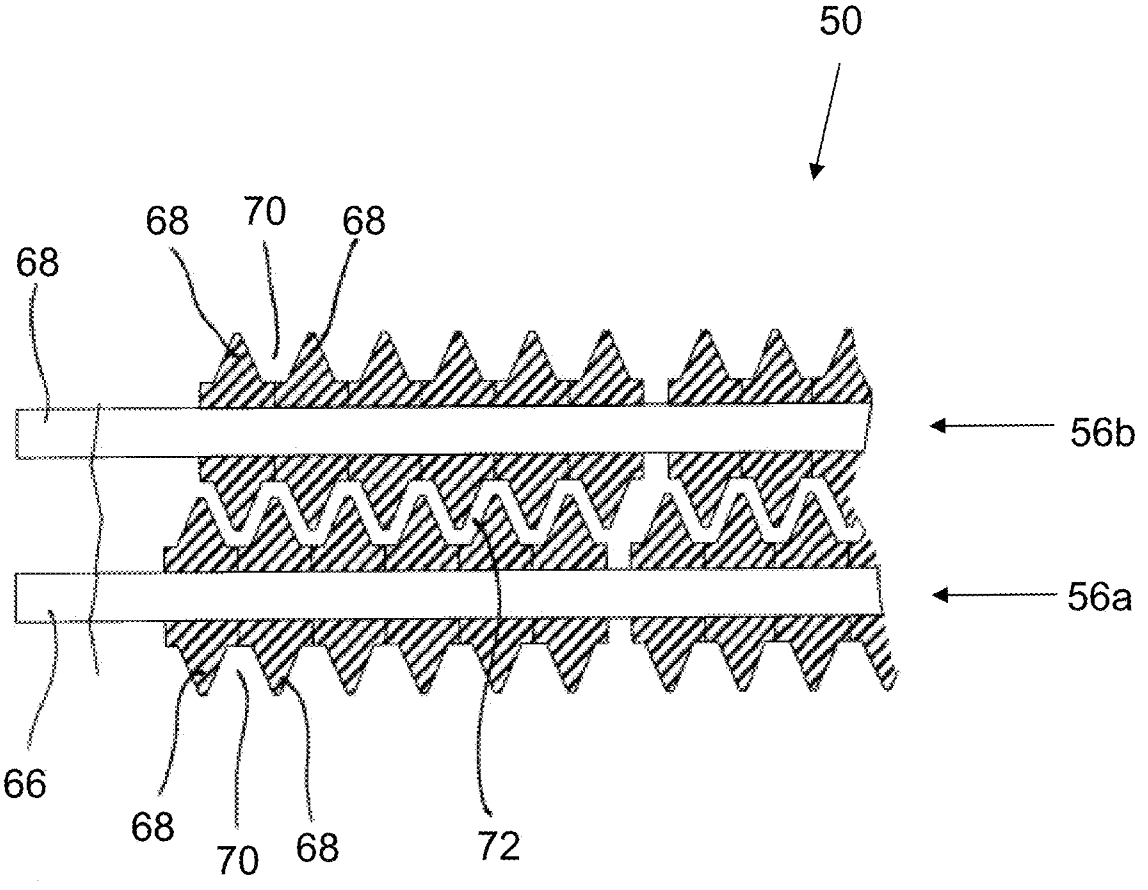
Figure 7:
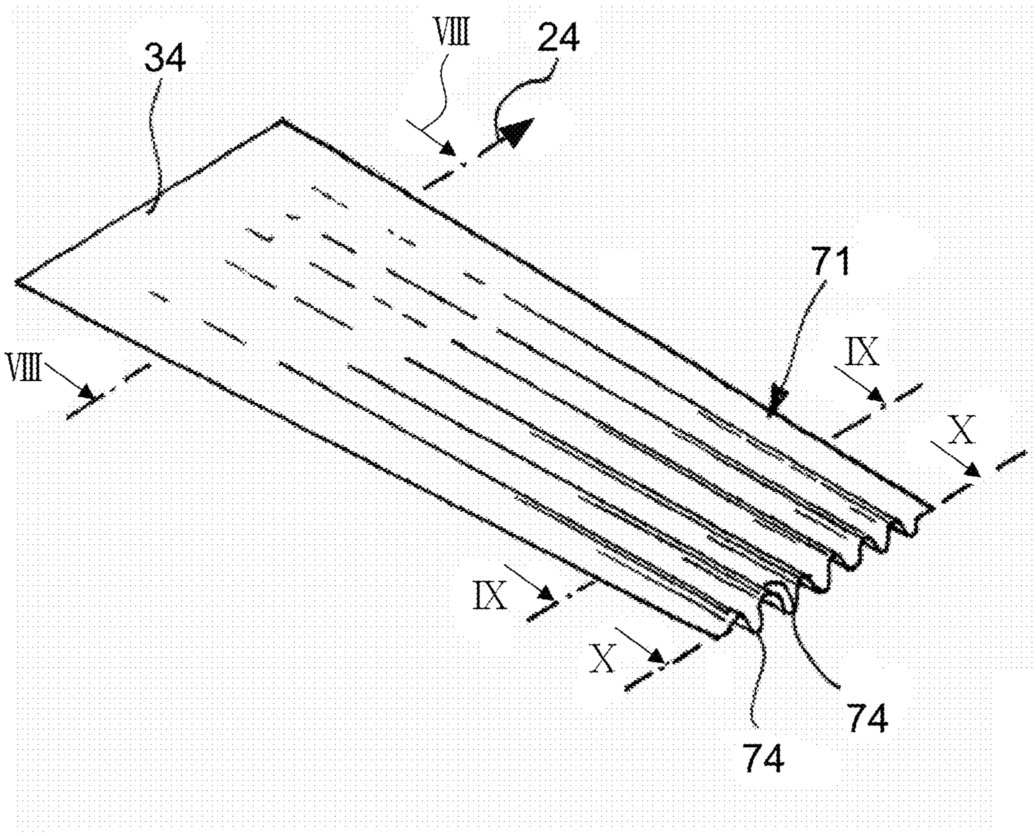
Figure 14:
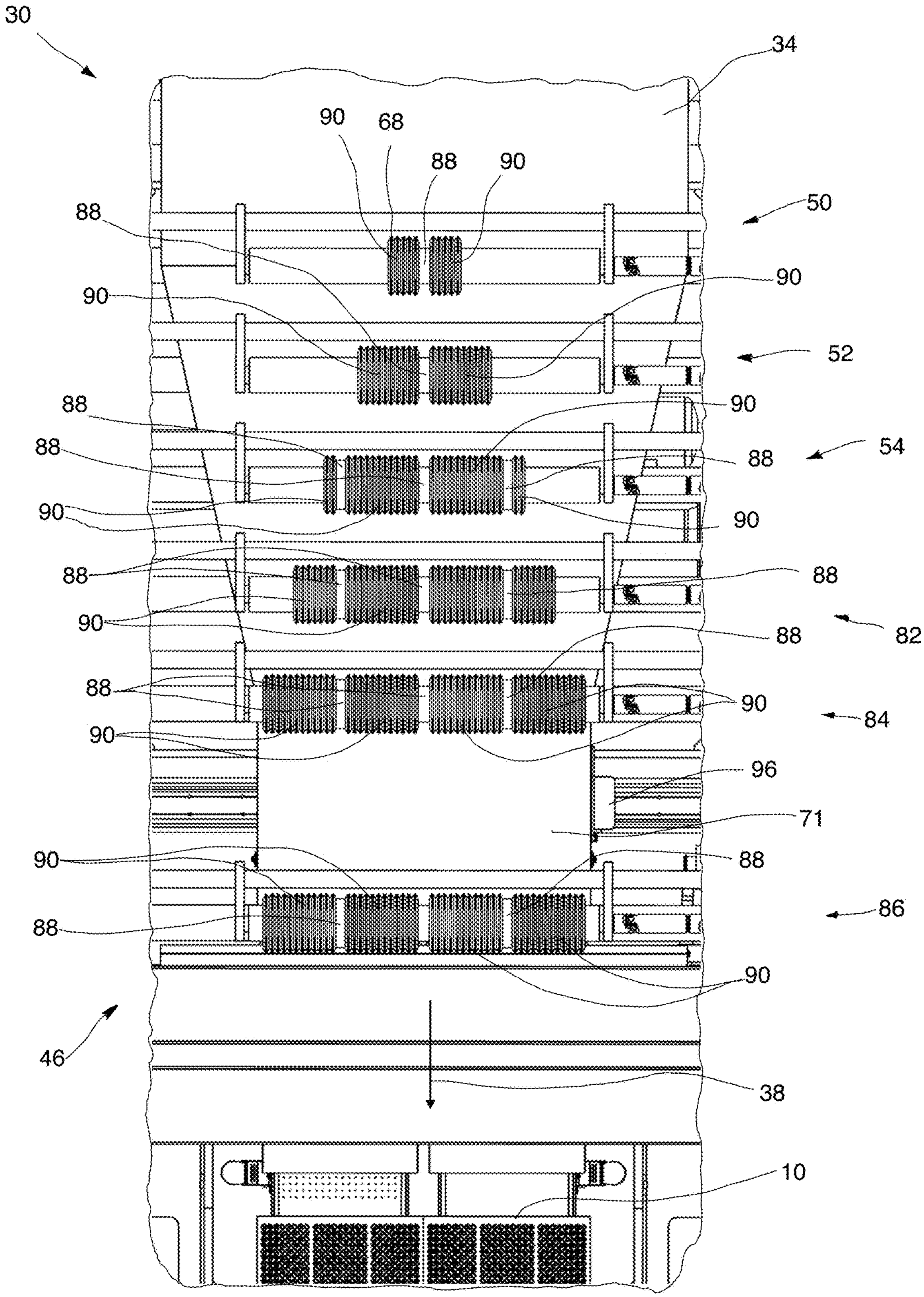
Figure 15:
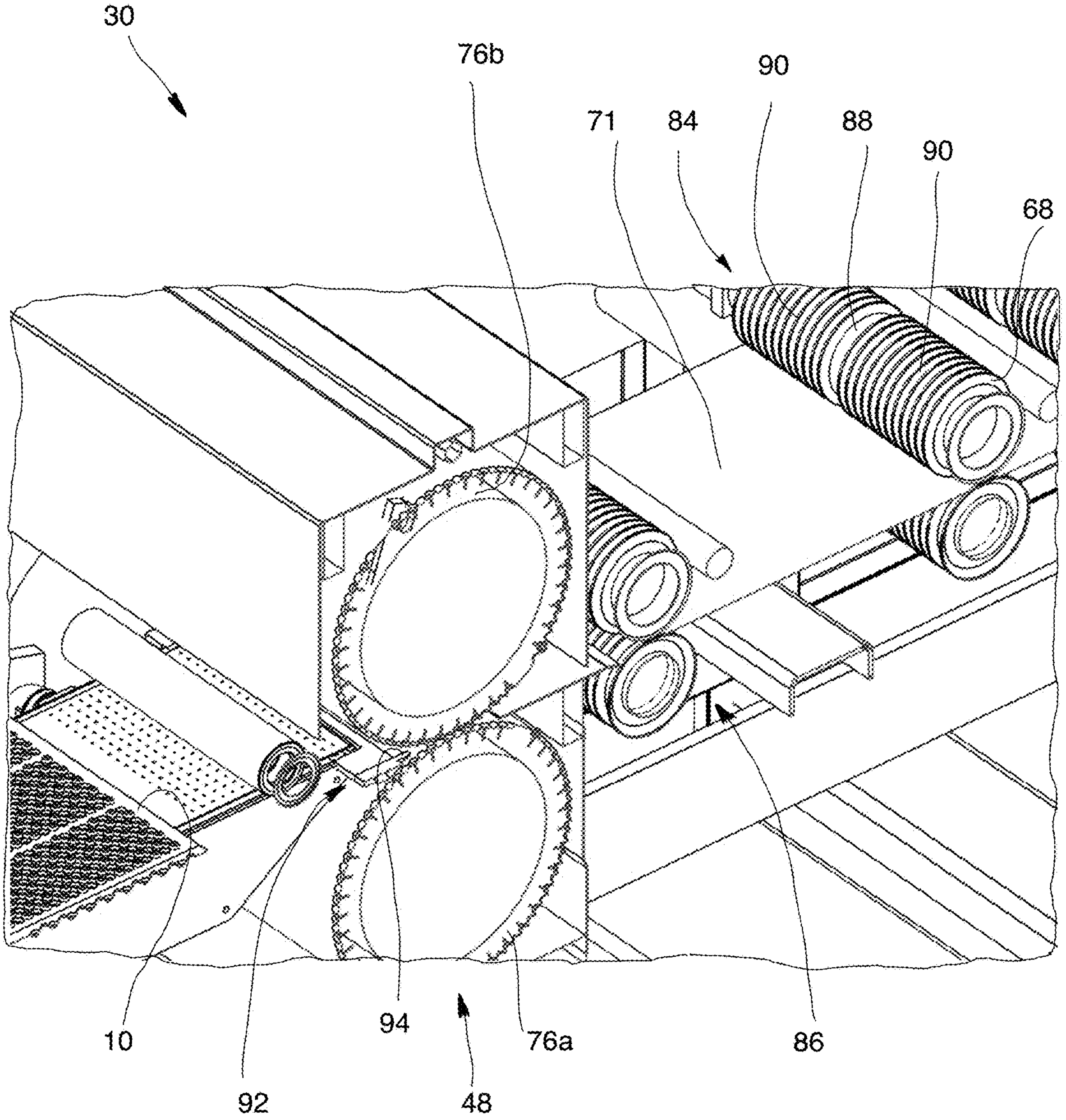
Figure 16:
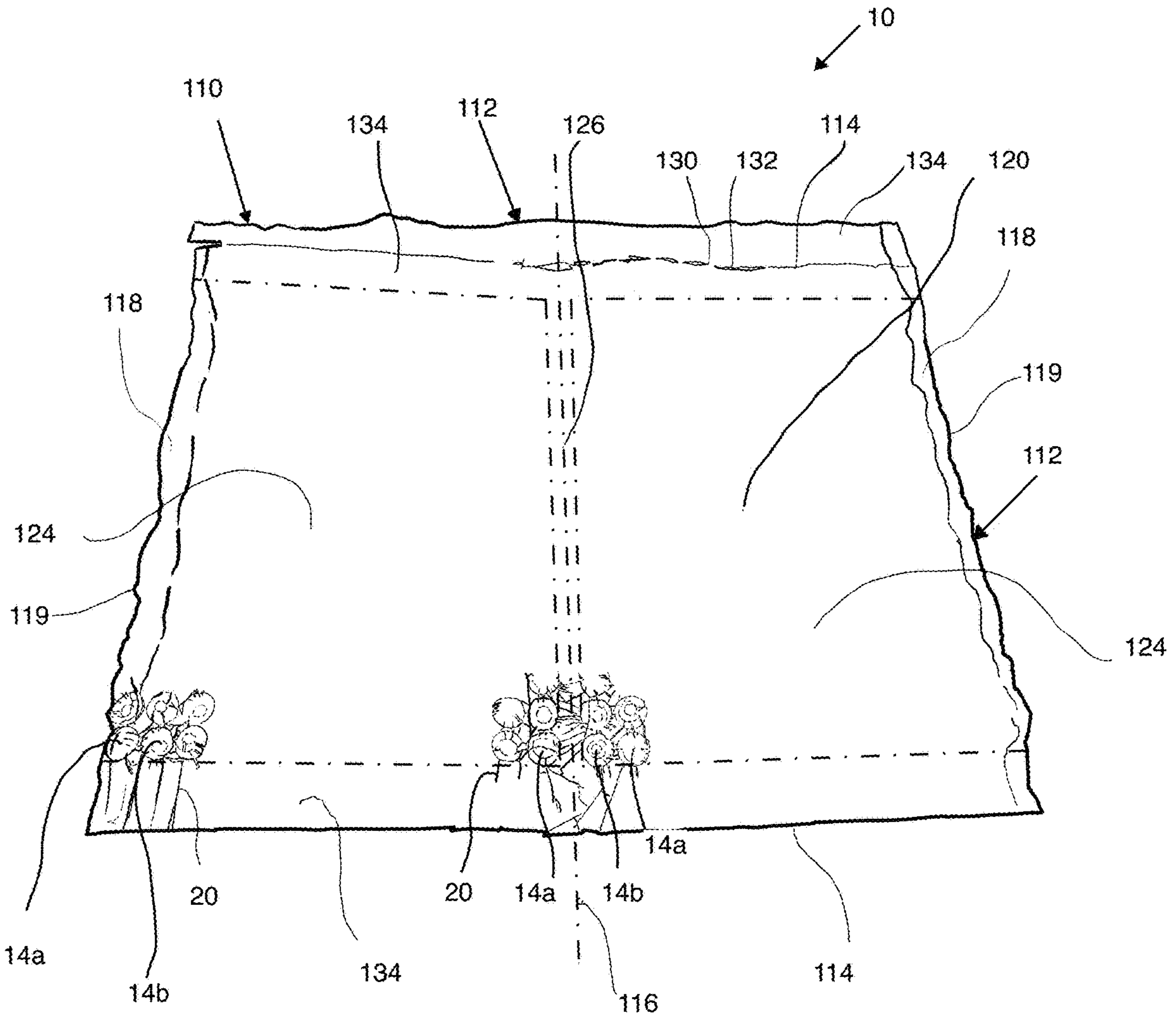
Figure 17:
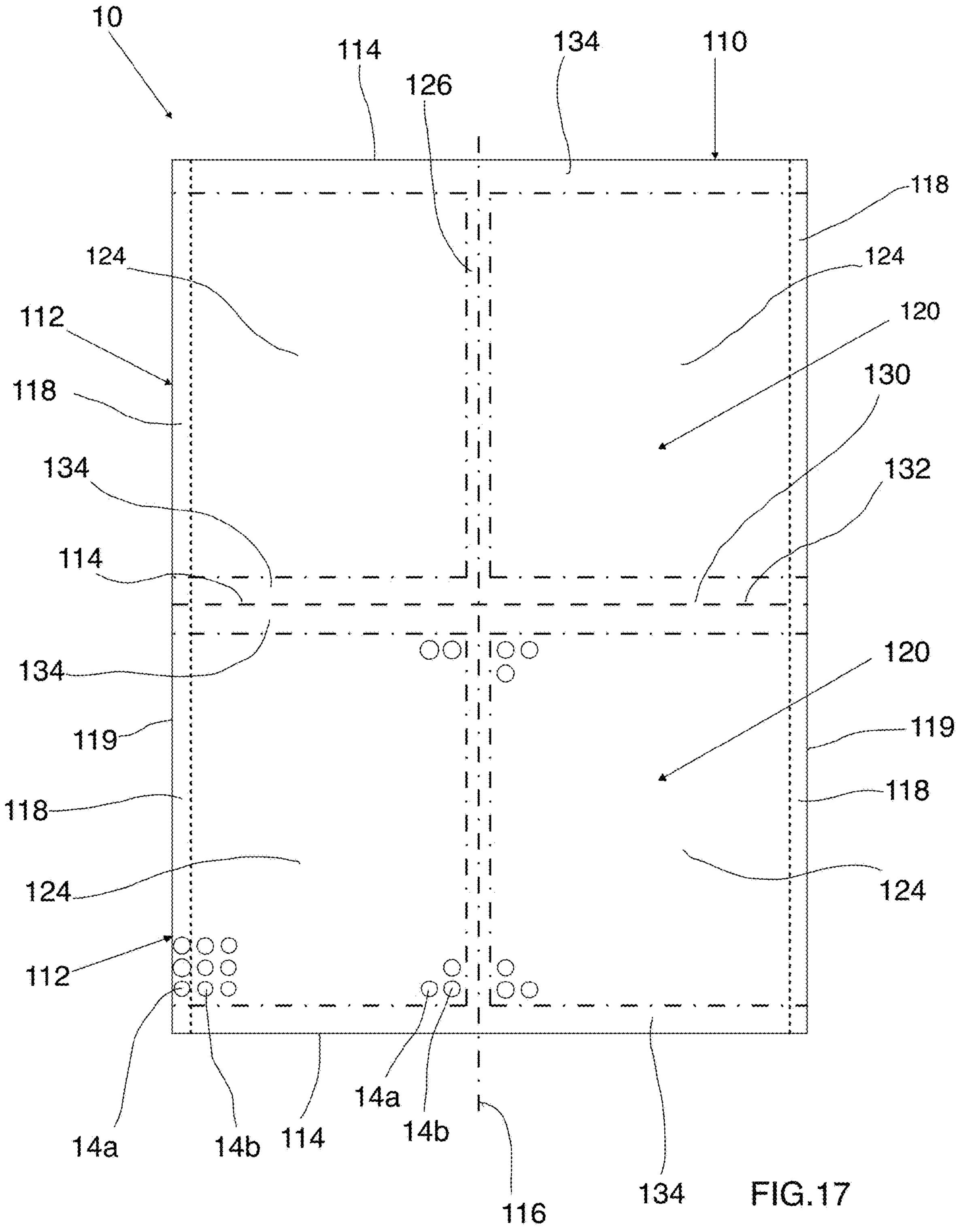

The invention now will be described with reference to the attached drawing. In the drawing is FIG. 1 a perspective partial view of an embossed cushioning material comprising embossed protrusions and a plurality of first creases;

FIG. 2 a schematic sectional view along line II-II of FIG. 1;

FIG. 3 a schematic side view of an arrangement for producing the embossed cushioning material of FIGS. 1 and 2;

FIG. 4 a more detailed perspective view of the arrangement of FIG. 3;

FIG. 5 a perspective view of parts of an undulating device and an embossing device of the arrangement of FIG. 3;

FIG. 6 a partial sectional view through a first pair of cooperating forming rollers of the undulating device of FIG. 4;

FIG. 7 a perspective view on a portion of an intermediate product during execution of a method for producing the embossed cushioning material of FIGS. 1 and 2;

FIGS. 8-13 schematic sectional representations of the shape of a paper material at different positions during its way through the arrangement of FIG. 3 according to lines VIII to XIII of FIG. 3;

FIG. 14 a view from above onto a region of an alternative embodiment of an arrangement for producing embossed cushioning material;

FIG. 15 a perspective view onto a part of the region of FIG. 14;

FIG. 16 a simplified perspective view onto an embossed cushioning material manufactured by the arrangement of FIGS. 14-15; and FIG. 17 a schematic and simplified view from above onto the material of FIG. 16.

It is to be noted that for the sake of clarity in the figures only exemplary but not all elements and portions or regions are designated with reference signs. Moreover, functionally equivalent elements and regions have the same reference numerals in different embodiments.

In the figures, an embossed cushioning material generally has the reference sign 10. As can be seen from FIGS. 1 and 2, the embossed cushioning material 10 is generally flat with a reference or middle plane 12. It comprises a plurality of first embossed protrusions 14*a* and a plurality of second embossed protrusions 14*b*. The first embossed protrusions 14*a* extend from the reference or middle plane in a first direction 16.

The second embossed protrusions 14*b* extend from the reference or middle plane 12 in a second direction 18, the second direction 18 being opposite to the first direction 16. Both directions 16 and 18 are orthogonal to the reference or middle plane 12. The position of the first embossed protrusions 14*a* and the second embossed protrusions 14*b* are arranged in an alternating order which means that in a row of protrusions adjacent to a first embossed protrusion 14*a* there are two second embossed protrusions 14*b*.

The embossed cushioning material 10 further comprises a plurality of first creases 20. As can be seen especially from FIG. 1, the generally flat embossed cushioning material 10 has a longitudinal direction 22 and a lateral direction 24. The first creases 20 essentially extend parallel to the longitudinal direction 22, which is the direction orthogonally to the drawing plane of FIG. 2. The embossed cushioning material 10 further comprises a plurality of second creases 25. The second creases 25 essentially extend parallel to the lateral direction 24.

In the present exemplary embodiment the embossed cushioning material 10 is made from craft paper. It is particularly preferred that the embossed cushioning material 10 is made from recycled craft paper. The grammage of the initially flat craft paper material is in the range of approximately 40-76 $g/m^2$, more preferably in the range of approximately 50-60 $g/m^2$.

In the present exemplary embodiment a cross sectional shape, when viewed from the side (FIG. 2), of the embossed protrusions 14*a* and 14*b* is approximately half-circular. In other non-shown embodiments the cross sectional shape may be essentially rectangular or essentially trapezoid. Furthermore, in the present exemplary embodiment a cross sectional shape, when viewed from above (FIG. 1), of the embossed protrusions 14*a* and 14*b* is approximately circular. In other non-shown embodiments the cross sectional shape may be oval or polygonal, specifically hexagonal.

In the present exemplary embodiment a height 26 (FIG. 2) of the protrusions 14*a* and 14*b* is in the range of 4-18 mm, more preferably in the range of 4-7 mm. Furthermore, in the present exemplary embodiment the embossed protrusions 14*a* and 14*b* have a maximum transverse dimension 28, when viewed from above (along first and second directions 16 and 18, see FIG. 2), of approximately 10-18 mm, more preferably of approximately 12-16 mm. Furthermore, in the present exemplary embodiment a density of the embossed protrusions 14*a* and 14*b*, that is the total number of protrusions 14*a* and 14*b* per area, is in the range of approximately 4000-5500 $1/m^2$, more preferably in the range of approximately 4300-5300 $1/m^2$.

Reference is now made to FIG. 3 showing an arrangement 30 for producing the embossed cushioning material 10. It is to be understood that in FIG. 3 only those components of the arrangement 30 are shown which are particularly important for producing the first and second creases 20 and 25 and the first and second embossed protrusions 14*a* and 14*b* of the embossed cushioning material 10.

The arrangement 30 comprises a supply 32 for supplying an initially flat and web-type paper raw material 34. The web-type paper raw material 34 may be provided by way of example as a roll 36 of paper. In an alternative non-shown embodiment the flat web-type paper raw material may be provided as a stack of zigzag folded paper. The flat web-type paper raw material 34 is conveyed along a transport path 38 through the arrangement 30.

It first passes a tensioning unit 40 comprising two stationary cylindrical rollers 42 and a vertically movable cylindrical roller 44. The vertically movable cylindrical roller 44 puts the flat web-type paper raw material 34 under a certain tension in the direction of the transport path 38 by its weight. However, the tensioning action of the vertically movable cylindrical roller 44 may be further enhanced for example by a spring forcing the vertically movable cylindrical roller 44 downwardly.

Seen in the direction of the transport path 38 downstream of the tensioning unit 40 an undulating device 46 and an embossing device 48 are arranged. In the present exemplary embodiment the undulating device 46 comprises three pairs 50, 52 and 54 of cooperating forming rollers or devices, respectively, 56*a/b*, 58*a/b*, and 60*a/b*.

FIG. 4 is a more complete and detailed drawing of the arrangement 30. The arrangement further comprises a machine frame 62 supporting the supply 32, the tensioning unit 40, the undulating device 46 and the embossing device 48. As can be seen from FIG. 4, the arrangement 30 further comprises an end processing unit 64 which is also supported by the machine frame 62. The end processing unit 64 finishes the cushioning material into a product ready for shipping to a customer. By way of example, the end processing unit 64 may comprise a cutting means which cuts the embossed and still web-type cushioning material into rectangular sheets. Furthermore, the end processing unit 64 may comprise an adhesive application means which applies a post-it-type adhesive onto the edges of the rectangular sheets of embossed cushioning material. Also, the end processing unit may comprise a stacking unit which arranges the rectangular sheets of embossed cushioning material in stacks which then can be placed in boxes to be shipped to and used by a customer.

The general designs of the forming devices 56-60 are similar to each other. This general design therefore will be described hereinafter by way of example with reference to the forming devices 56*a/b* of the first pair 50 (FIGS. 5 and 6).

The forming device 56*a* comprises a shaft 66 on which is arranged a plurality of disk type conically shaped portions 68. The disk type portions 68 are spaced apart from each other and arranged along a longitudinal axis of the shaft such that interstices 70 are formed between adjacent disk type portions 68. The disk type portions 68 of the first forming device 56*a* mesh with interstices 70 between the disk type portions 68 of the second forming device 56*b*, the interstices 70 formed between the meshing disk type portions 68 of the forming devices 56*a* and 56*b* forming an undulated space 72 creating undulations 74 (FIG. 7) of the initially flat web-type paper raw material 34 when it passes between the first and the second forming devices 56*a* and 56*b*.

As can be seen from the figures, the arrangement 30 is able to produce the embossed cushioning material 10 without the need of a pretreatment by means of hot steam prior to creating the embossed protrusions 14*a*-*b*. However, it is to be understood that in a non-shown embodiment the arrangement 30 may additionally comprise means for applying hot steam and/or water dust and/or water spray to the initially flat web-type paper raw material 34 prior to feeding the material 34 into the undulating device 46 and/or to the intermediate product 71 (FIG. 7) prior to feeding the intermediate product 71 into the embossing device 48. Said means may comprise a tank for storing hot steam or water as well as nozzles for directing the hot steam and/or the water dust or spray to the material.

FIG. 7 is a perspective representation of an intermediate product 71 of the initially flat web-type paper material 34 as it evolves between the tensioning unit 40 and the second pair 52 of forming devices 58*a/b*.

Figure 8:
Figure 9:
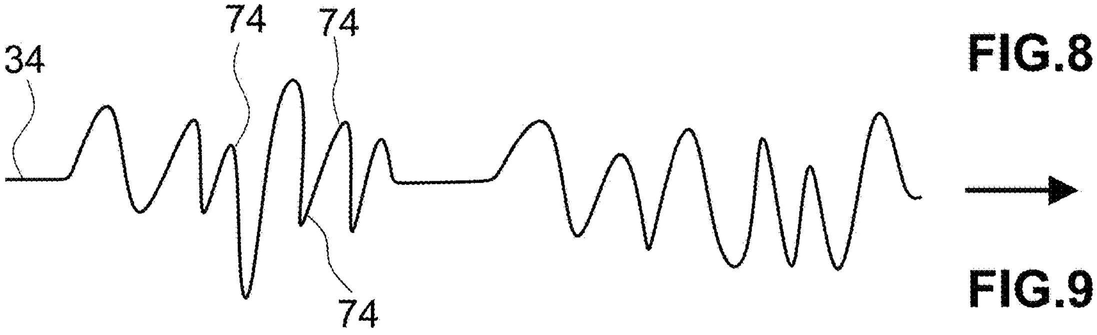
Figure 10:
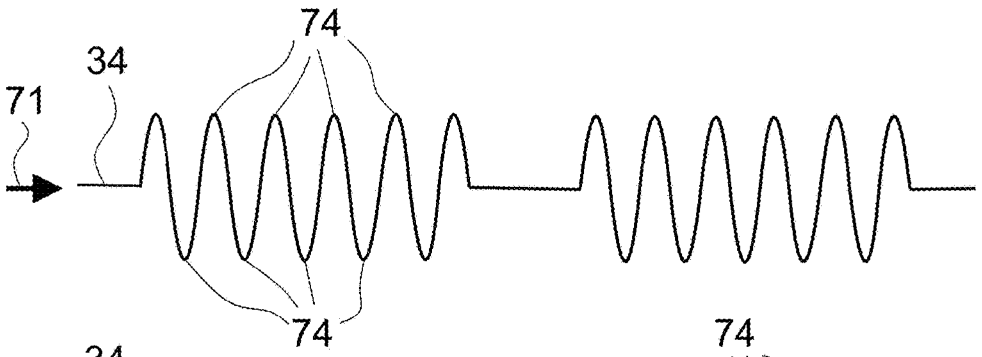

FIG. 8 is a schematic sectional view of the still flat web-type paper material 34 seen in the direction of the transport path 38 shortly after the tensioning unit 40 (FIG. 3). FIG. 9 is a schematic sectional view of the web-type paper material 34 seen in the direction of the transport path 38 shortly before the first pair 50 of forming devices 56*a/b*, and FIG. 10 is a schematic sectional view of the web-type paper material 34 seen in the direction of the transport path 38 shortly after the first pair 50 and prior to entering the second pair 52 of forming devices 58*a/b*. As can be seen from FIGS. 7-10, the first pair 50 of the cooperating forming devices 56*a* and 56*b* reduces a first (lateral) dimension which is parallel to the lateral direction 24 of the initially flat paper material 34 by approximately 40% by creating a plurality of undulations 74.

Figure 11:
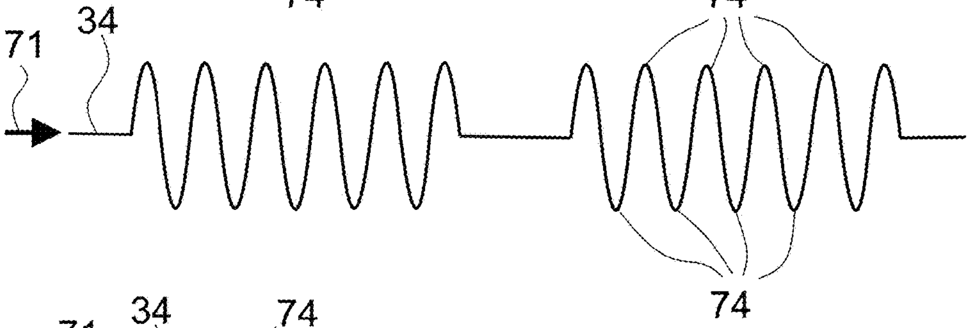

As can be seen from FIG. 5, the forming devices 58*a* and 58*b* of the second pair 52 have a larger diameter than those of the first pair 50 which helps to homogenize and stabilize the undulations 74, as can be seen from FIG. 11 which is a schematic sectional view of the undulated web-type paper material 34 seen in the direction of the transport path 38 shortly after the second pair 52 and prior to entering the third pair 54.

As can be seen from FIG. 5, the forming devices 60*a* and 60*b* of the third pair 54 have approximately the same diameter as those of the second pair 52. However, the disk type portions (without reference signs) are slimmer than those of the second pair 52 such that a higher number of disk type portions is arranged along the shafts of the forming devices 60*a* and 60*b*. Furthermore, the depth of the interstices between the disk type portions is smaller than that of the first and second pair 50 and 52.

As can be seen from FIG. 12, which again is a schematic sectional view of the undulated web-type paper material 34 seen in the direction of the transport path 38 shortly after the first pair 54 and prior to entering the embossing device 48, the third pair 54 increases the number of undulations 74 while reducing the height of these undulations 74.

After the web-type paper material 34 has passed the undulating device 46 and after having been transformed into an undulated intermediate web-type paper material 71 it enters the embossing device 48 which comprises first and second rotating and driven embossing cylinders 76*a* and 76*b*. The first and second embossing cylinders 76*a* and 76*b* are designed and arranged to receive the undulated intermediate paper material 71 therebetween. Both embossing cylinders 76*a/b* have a peripheral surface 78 comprising a plurality of protrusions and recesses creating the embossed protrusions 14*a* and 14*b* as described above with reference to FIGS. 1 and 2 when the undulated web-type paper material 34 is received between the first and second embossing cylinders 76*a* and 76*b*. It is to be understood that the protrusions in the peripheral surfaces 78 of the first and second embossing cylinders 76*a* and 76*b* mesh with complementary recesses in the respective other embossing cylinder 76*a* and 78*b*.

Figure 13:
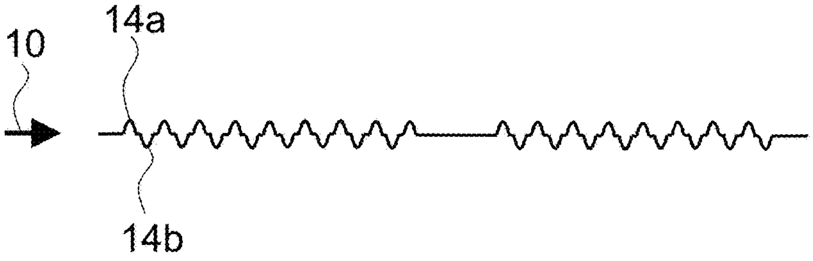

A schematic sectional view of the embossed cushioning material 10 downstream of the embossing device 48 seen in the direction of the transport path 38 is shown in FIG. 13.

Figure 12:
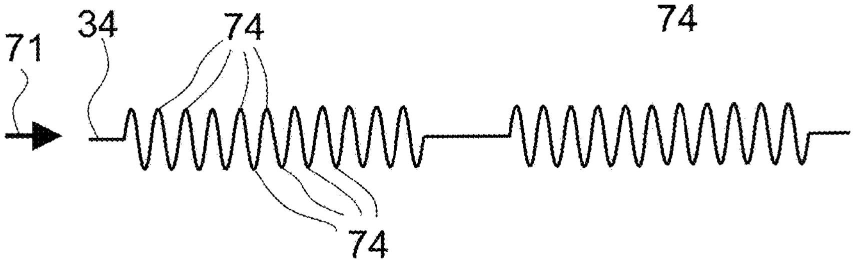

It is to be understood that the undulations 74 of the undulated web-type paper material 34 as shown in FIG. 12 provide a surplus of material which allows to emboss the first protrusions 14*a* and the second protrusions 14*b* by means of the first and second embossing cylinders 76*a* and 76*b* without rupture of the material. Since the gap between the first and second embossing cylinders 76*a* and 76*b* is very small, preferably only slightly bigger than the thickness of the flat web-type paper raw material 34 as enrolled on the roll 36, those undulations 74 which are not or not fully consumed for creating the first and second protrusions 14*a* and 14*b* are transformed, namely pressed into the first creases 20 as shown in FIGS. 1 and 2.

As can be seen from FIGS. 1 and 2 the first creases 20 have been created prior to or during embossing the first and second protrusions 14*a* and 14*b* since they are extending into all regions of the embossed material and since they are located and arranged within the thin layer of the paper material. This would not be possible if the first creases were created only after the first and second protrusions 14*a/b* have been embossed.

The forming devices 56*a*-60*b* of the pairs 50-54 of the undulating device 46 and the first and second embossing cylinders 76*a/b* of the embossing device 48 are driven with specific rotational speeds. The rotational speeds of the forming devices 56-60 are selected such that the web-type paper raw material 34 is conveyed through the undulating device 46 with a uniform speed in the direction of the transport path 38. The undulating device 46 and the embossing device 48 therefore form first and second conveying means.

In contrast hereto, the rotational speeds of the first and second embossing cylinders 76*a* and 76*b* on the one hand and the rotational speeds of the forming devices 60*a/b* of the third pair 54 on the other hand are selected such that the undulated web-type paper material 34 and 71, respectively, is conveyed through the embossing device 48 along the transport path 38 at a lower speed than through the undulating device 46. This results in a crumpling action applied to the undulated web-type paper material 34 in longitudinal direction 22, which extends parallel to the direction of the transport path 38. By consequence, the third pair 54 of cooperating forming rollers 60*a* and 60*b* and the embossing device 48 with its first and second embossing cylinders 76*a* and 76*b* form a crumpling device 80.

The crumpling action of the crumpling device 80 results in a reduction of the dimension (second dimension) of the undulated web-type paper material 34 in the longitudinal direction 22 by approximately 10%. The reduction of the dimension of the undulated web-type paper material 34 in the longitudinal direction 22 results in the creation of second undulations which are pressed by the first and second embossing cylinders 76*a/b* into the above mentioned second creases 25. The second creases 25 extend essentially orthogonally to the first creases 20.

While with reference to the figures an embodiment of an arrangement 30 has been described which is intended to be stationary, it is to be understood that the technical principles of the arrangement 30 might be integrated also in a small and compact mobile device which may be arranged close to the location where a user uses the embossed cushioning material 10 for wrapping and protecting an article. In order to reduce the horizontal dimensions of such a mobile device, the supply for supplying the flat web type paper raw material, the undulating device and the embossing device may be arranged vertically above each other, and the transport path of the flat web type paper raw material as well as of the intermediate product may comprise horizontally as well as vertically extending portions.

FIGS. 14 and 15 relate to a different embodiment of an arrangement 30 for producing embossed cushioning material from an initially flat web type paper raw material 34. While the first embodiment of FIGS. 3-5 comprised an undulating device 46 having three stages 50-54, the second embodiment of FIGS. 14 and 15 comprises an undulating device 46 having six stages 50-54 and 82-86. The first five stages 50-54 and 82-84 differ from each other by the number of undulations 74 of the respective undulated forming space 72.

More specifically, the lateral extension of the undulating forming space 72, that is the extension orthogonally to the direction of the transport path 38 and being essentially in the plane of the flat web type paper material 34, increases continuously from the first stage 50 to the fifth stage 84. This is realized simply by adding disk type portions 68, while in the present exemplary embodiment all disk type portions 68 of all stages 50-54 and 82-86 are identical. This results in a height of the undulations of the undulating forming space 72 being essentially identical in all stages 50-54 and 82-86 of the undulating device 46. The "height" of said undulations physically corresponds to an "amplitude" of the undulations.

Moreover, the design of the undulating device 46 results in a width of each undulation of the undulating forming space of all stages 50-54 and 82-86 being essentially identical. The "width" of an undulation physically corresponds to a "wavelength" of the undulations.

As can be seen especially from FIG. 14, each stage 50-54 and 82-86 comprises, seen in the above-mentioned lateral direction, at least one region 88 which is free of any undulated forming space 72 and which is delimited on both sides by regions 90 having an undulated forming space 72. Furthermore, as can be seen from FIG. 14, while the first and second stages 50 and 52 only comprise one single region which is free of any undulated forming space 72, all stages 54 and 82-86 which are downstream from the second stage 52 comprise three regions 82 being free of any undulated forming space 72. As further can be seen from FIG. 14, the regions 90 of a downstream stage 52-54 and 82-86 are aligned, seen in the direction of the transport path 38, with the regions 90 of the upstream stages 50-54 and 82-84.

As is apparent from FIG. 15, the arrangement 30 comprises a separating device 92 in the form of a plurality of deflectors 94. The separating device 92 is arranged immediately downstream of the embossing device 48. The separating device 92 is arranged and designed to prevent the embossed material 10 exiting from the embossing device from sticking or staying sticked to the embossing cylinders 76*a* and 76*b*. The deflectors 94 are arranged close to the embossing cylinders 76*a* and 76*b* immediately downstream of the region where both embossing cylinders 76*a* and 76*b* cooperate, such that the deflectors 94 may come into sliding contact with the embossed cushioning material 10 and can smoothly lift off the embossed cushioning material 10 from the embossing cylinders 76*a* and 76*b* in case that, due to the meshing protrusions and cavities on the peripheral surfaces 78 of the embossing cylinders 76*a* and 76*b*, the embossed cushioning material 10 is sticking to one of said cylinders 76*a* and 76*b*.

In order to ease the operation of the deflectors 94, the deflectors 94 are essentially aligned both with the regions of the stages 50-54 and 82-86 of the undulating device 46 and with regions (not visible in the drawing) of the embossing cylinders 76*a* and 76*b* of the embossing device 48 which are free of protrusions and cavities, when seen in lateral direction. This provides for an essentially flat surface at the embossed cushioning material 10 at the location of the deflectors 94, this flat surface having no embossed protrusions and at least less first creases 20.

Finally, as can be seen from FIG. 14, the arrangement 30 further comprises a folding device 96 which is arranged between the fifth stage 84 and the sixth stage 86 of the undulating device 46. The folding device 86 is arranged and designed to fold both lateral edge portions of the intermediate product 71 inwardly upon itself.

An embossed cushioning material 10 which can be produced with the arrangement 30 of FIGS. 14 and 15 is now explained with respect to FIGS. 16 and 17. FIGS. 16 and 17 represent a lengthy web 110 comprising, purely by way of example, two sheets 112 of embossed cushioning material 10 which are linked to each other by means of a crosswise extending perforation line 114 (the upper sheet 112 is only partially shown in FIG. 16). A longitudinal axis of the web 110 is drawn in both figures by a dot and dash line 116. Each of the sheets 112 comprises, when seen along the longitudinal axis 116, a left lateral edge region 118 and a right lateral edge region 118. The boundary of the edge regions 118 towards a central region 120 is drawn as a dotted line in FIG. 17. By consequence, the central region 120 extends between both edge regions 118. This means that the central region 120 is delimited in FIG. 17 by the two lateral dotted lines parallel to the longitudinal direction 116 of the web 110.

While the central region 120 in the present exemplary embodiment comprises one single material layer, both lateral edge regions 118 comprise two adjacent material layers. These double layer lateral edge regions 118 are formed by a 180° fold 119 of the single material layer extending from the central region 120 towards the lateral edge regions 118. The fold 119 forms the outer lateral edges of the sheets 112. In the arrangement 30 of FIG. 14, the lateral edges of the flat web-type paper raw material 34 and the intermediate product 71, respectively, are folded inwardly by means of the lateral folding device 96.

As can be seen from FIGS. 16 and 17, the embossed protrusions 14*a/b* are also present in the lateral edge regions 118. The areas 124 of the embossed cushioning material 10, in which embossed protrusions 14 are present, are delimited in FIGS. 16 and 17 by dot and dash lines and have a generally rectangular outer shape. As can be seen from FIGS. 16 and 17, these areas 124 extend laterally outwardly up to the lateral edges 119 of the cushioning material 10. More specifically, in the present exemplary embodiment the width of the lateral edge regions corresponds more or less to the width of a single protrusion 14*a/b*.

It is, however, to be understood that the width of the lateral edge region 118 may vary along the length of the embossed cushioning material 10, that is along the longitudinal direction 116, as is shown in FIG. 16. The reason is on the one hand that when the pre-undulated and at its lateral edges folded web-type paper raw material 34 or intermediate product 71, respectively, enters the embossing device 48 with its embossing cylinders 70*a/b*, the first creases 20 are created rather randomly by the material being pressed between the embossing cylinders 70*a/b*. This leads to a slightly non-uniform reduction of the width of the web-type paper raw material 34 and at the end to an embossed cushioning material 10 having lateral edges which are not absolutely straight, as is shown in FIG. 16. The reason is on the other hand that the folding process in the folding device 96 may not be uniformly which also contributes to a variable width of the double layer lateral edge regions 118 along the longitudinal direction 116.

The embossed cushioning material 10 in the present exemplary embodiment comprises a longitudinally extending strip shape region 126 which is free of protrusions 14*a/b* and which is delimited on both sides by the areas 124 having protrusions 14*a/b*. In the present exemplary embodiment, one sheet 112 of embossed cushioning material comprises one single and, with reference to the lateral edge regions 118, centrally located strip shape region 126 extending from a leading edge (without reference sign, in FIGS. 16 and 17 the lower edge of a sheet 112) to a trailing edge (without reference sign, in FIGS. 16 and 17 the upper edge of a sheet 112). As can be seen from both FIGS. 16 and 17, the strip shape region 126 is delimited on both sides by the regions 124 having protrusions 14*a/b*. As further can be seen from the figures, the width of the strip shape region 126 corresponds approximately to at least the width of a protrusion 14*a/b*.

The presence of the strip shape region 126 has the following reason: when the flat web-type paper raw material passes through the embossing device 48 with its embossing cylinders 70*a/b*, the material is received and deformed between the walls of the embossing cavities and the matching embossing protrusions of the embossing cylinders 70*a/b*. When the deformed material leaves the gap between the two embossing cylinders 70*a/b*, it has a certain tendency to stick to one of these cylinders 70*a/b*.

In order to prevent the embossed cushioning material 10 from sticking or staying sticked to the cylinders 70*a/b*, the arrangement 30 and specifically the embossing device 48 comprises the above mentioned separating means 92 which is arranged adjacent the embossing cylinders 70*a/b* immediately downwardly of the embossing cylinders 70*a/b*. These separating means 92 with its deflectors 94 comes into sliding contact with the embossed cushioning material 10 and lifts the material off an embossing cylinder 70*a/b*, if the material 10 remains sticked to one of these cylinders 70*a/b*.

This separating means 92 is arranged, seen in lateral direction of the embossed cushioning material 10, at the same location where the strip shape region 126 is located, that is where on the embossing cylinders 70*a/b* no embossing protrusions and matching cavities are present. Thus, the deflector means 128 cannot contact the cushioning material in the areas 124 having the protrusions 14*a/b*, but rather and only in the strip shape region 126 being free of any protrusion 14*a/b* and therefore being relatively smooth and even. By consequence, the strip shape region 126 being free of protrusions 14*a/b* prevents the deflector means 128 from damaging the embossed cushioning material 10 by interfering with any embossed protrusions 14*a/b*.

As has already been mentioned, the lengthy web 110 of embossed cushioning material 10 comprises sheets 112 separated by perforation lines 114. These perforation lines extend crosswise, that is orthogonally to the longitudinal direction 116. A perforation line 114 is formed by material bridges 130 and material slits 132. The material slits 132 are located between the material bridges 132. By consequence, along the length extension of a perforation line 114, material bridges 130 and material slits 132 alternate. In the present exemplary embodiment, the perforation line 114, that is the material slits 132, has been cut into the "final" embossed cushioning material after the undulating and embossing steps.

In the present exemplary embodiment shown in FIGS. 16 and 17, the material slits 132 in the flat web-type raw material 34 (having no creases) are approximately 20 mm long, whereas the material bridges 130 are approximately 0.5 mm long. Therefore the length relation is at least 15, more preferably at least between 30-50, and the length of the material bridges 130 may be in the range of approximately 0.3-1.0 mm.

As can be seen from FIGS. 16 and 17, on both sides of a perforation line 114 there may be a crosswise extending strip shape region 134 which is free of any embossed protrusion 14*a/b*. In the present exemplary embodiment this strip shape region 134 extends from one lateral edge 119 of a sheet 112 to the opposite lateral edge 119 of the sheet 112. Seen in the direction of the strip shape region 134, the width of such a strip shape region 134 may be in the range of 10-40 mm, more preferably in the range of 20-30 mm.

The invention claimed is:

1. An arrangement for producing embossed cushioning material from an initially flat material, comprising an embossing device for providing a plurality of embossed protrusions to the material, an undulating device comprising undulated forming spaces which creates undulations in the initially flat material prior to the undulated material being provided to the embossing device, and a conveying means for conveying the initially flat material along a transport path in a continuous process through the undulated forming spaces, wherein the undulating device, seen in the direction of the transport path, comprises at least two stages each comprising an undulated forming space, the undulated forming space of a downstream stage differing in number and/or height of undulations from the undulated forming space of an upstream stage, wherein each stage comprises, seen in lateral direction, at least one region which is free of any undulated forming space and which is delimited on both sides by regions having an undulated forming space.

2. The arrangement of claim 1, wherein a lateral extension of the undulating forming space of the downstream stage is greater than the lateral extension of the undulating forming space of the upstream stage.

3. The arrangement of claim 1 wherein a height of the undulations of the undulating forming space of the downstream stage is essentially identical to the height of the undulations of the undulating forming space of the upstream stage.

4. The arrangement of claim 1 wherein a width of the undulations of the undulating forming space of the downstream stage is essentially identical to the width of the undulations of the undulating forming space of the upstream stage.

5. The arrangement of claim 1 wherein, seen in the direction of the transport path, the number of regions which are free of any undulated forming space increases from at least one upstream stage to a subsequent downstream stage.

6. The arrangement of claim 1 wherein the undulated forming space is formed between two counter rotating forming rollers.

7. The arrangement of claim 1 wherein it comprises a crumpling device which crumples the material in a second dimension which is orthogonal to a first dimension.

8. The arrangement of claim 7 wherein the crumpling device comprises a first driven conveying means and a second driven conveying means, the first driven conveying means being upstream when seen in the direction of the transport path, and the second driven conveying means being downstream when seen in the direction of the transport path, wherein each conveying means is designed and arranged to frictionally convey the material along the transport path, wherein in operation the conveying speed of the second conveying means is lower than the conveying speed of the first conveying means.

9. The arrangement of claim 1 wherein the embossing device comprises a first embossing cylinder and a second embossing cylinder, wherein the embossing cylinders are designed and arranged to receive the undulated material between them, at least the first embossing cylinder having a peripheral surface comprising a plurality of protrusions creating embossed protrusions in the material when it is received between the first embossing cylinder and the second embossing cylinder.

10. The arrangement of claim 9 wherein it comprises a separating device which is arranged immediately downstream of the embossing device, and which is arranged and designed to prevent the embossed material exiting from the embossing device from sticking or staying sticked to the embossing device.

11. The arrangement of claim 10 wherein the separating device comprises at least a deflector, wherein the embossing device, seen in lateral direction, comprises a region which is free of protrusions, and wherein, seen in the direction of the transport path, the deflector is essentially aligned with said region which is free of protrusions.

12. The arrangement of claim 11 wherein, seen in the direction of the transport path, the deflector is essentially aligned with a region which is free of any undulated forming space.

13. The arrangement of claim 1 wherein it comprises a folding device which is arranged and designed to fold at least one lateral edge portion of the initially flat material or of the undulated intermediate material inwardly upon itself.

* * * * *